US012683173B2

(12) United States Patent
Kajio

(10) Patent No.: US 12,683,173 B2
(45) Date of Patent: Jul. 14, 2026

(54) HUMIDIFIER FOR FUEL CELL

(71) Applicant: AISIN CORPORATION, Kariya (JP)

(72) Inventor: Katsuhiro Kajio, Kariya (JP)

(73) Assignee: AISIN CORPORATION, Kariya (JP)

( * ) Notice: Subject to any disclaimer, the term of this patent is extended or adjusted under 35 U.S.C. 154(b) by 588 days.

(21) Appl. No.: 18/249,276

(22) PCT Filed: Nov. 26, 2021

(86) PCT No.: PCT/JP2021/043473
§ 371 (c)(1),
(2) Date: Apr. 17, 2023

(87) PCT Pub. No.: WO2022/114147
PCT Pub. Date: Jun. 2, 2022

(65) Prior Publication Data
US 2023/0395828 A1     Dec. 7, 2023

(30) Foreign Application Priority Data

Nov. 26, 2020    (JP) ................................. 2020-195803

(51) Int. Cl.
*H01M 8/04119*          (2016.01)
*H01M 8/0258*          (2016.01)
(52) U.S. Cl.
CPC ..... *H01M 8/04149* (2013.01); *H01M 8/0258* (2013.01); *H01M 8/04141* (2013.01)
(58) Field of Classification Search
CPC ........... H01M 8/04149; H01M 8/0258; H01M 8/04141; H01M 8/04; H01M 8/04119;
(Continued)

(56) References Cited

FOREIGN PATENT DOCUMENTS

| DE | 20 2016 100 670 U1 | 6/2017 |
| JP | 2003-187839 A | 7/2003 |
| JP | 2008-282555 A | 11/2008 |

OTHER PUBLICATIONS

Yoshimura et al., JP 2008282555 A, Espacenet machine translation, 2008 (Year: 2008).*

(Continued)

*Primary Examiner* — Adam A Arciero
(74) *Attorney, Agent, or Firm* — Oblon, McClelland, Maier & Neustadt, L.L.P.

(57)          ABSTRACT

A humidifier for a fuel cell includes a humidifying unit that produces humidified air. The humidifying unit includes: a first separator having dry gas channels; a second separator having water-containing gas channels; a humidifying membrane that provides moisture contained in gas flowing through the water-containing gas channels to dry air flowing through the dry gas channels to produce the humidified air; protective films that reinforce the humidifying membrane; and a sealing material that is provided along a first outer edge portion of the humidifying membrane with the humidifying membrane and the protective films stacked together, and that seals between the dry gas channels and the water-containing gas channels. The humidifying membrane has a close contact region between the first outer edge portion of the humidifying membrane and a second outer edge portion of the protective film.

8 Claims, 7 Drawing Sheets

(58) Field of Classification Search
CPC ......... H01M 8/04291; B01D 2313/041; B01D
63/085; B01D 69/10; B01D 63/0822;
Y02E 60/50
See application file for complete search history.

(56) References Cited

OTHER PUBLICATIONS

Reinz, DE 202016100670; Espacenet machine translation, 2017
(Year: 2017).*
International Search Report issued Feb. 15, 2022 in PCT/JP2021/
043473 filed on Nov. 26, 2021, 2 pages.
Extended European Search Report dated Apr. 2, 2024 in corre-
sponding French Application No. 21898119.9, 10 pages.

* cited by examiner

HUMIDIFIER FOR FUEL CELL

TECHNICAL FIELD

The present invention relates to humidifiers for fuel cells that include a humidifying unit for providing moisture contained in water-containing air to dry air to produce humidified air.

BACKGROUND ART

In recent years, fuel cells have been used. The fuel cells are provided with a humidifier in order to humidify cathode gas to be supplied to the cathode. Some of such humidifiers include a humidifying unit in which separators for guiding gas and water-permeable membranes are alternately arranged. Such a humidifier is described in, for example, Patent Document 1 shown below.

Patent Document 1 describes a humidifier for a fuel cell. This humidifier for a fuel cell includes: a humidifying membrane serving as a humidifying member; incoming humidification channels communicating with an air supply passage through which air directed to an air electrode of the fuel cell passes; and outgoing humidification channels communicating with an air off-gas passage through which off-gas after power generation discharged from the air electrode of the fuel cell passes. The incoming humidification channels and the outgoing humidification channels are provided on plate members corresponding to the separators described above, and are arranged so as to face each other with the humidifying membrane interposed therebetween.

RELATED ART DOCUMENTS

Patent Documents

Patent Document 1: Japanese Unexamined Patent Application Publication No. 2003-187839 (JP 2003-187839 A)

SUMMARY OF THE INVENTION

Problem to be Solved by the Invention

A very thin humidifying membrane is used in the structure in which the incoming humidification channels and the outgoing humidification channels are arranged so as to face each other with the humidifying membrane interposed therebetween, such as the structure in the technique described in Patent Document 1. Such a thin humidifying membrane is prone to damage when handled in, for example, a manufacturing process. Therefore, there is room for improvement in increasing the strength of the humidifying membrane.

Accordingly, there is a demand for humidifiers for fuel cells whose humidifying membrane is less prone to damage.

Means for Solving the Problem

A characteristic configuration of a humidifier for a fuel cell according to the present invention is a humidifier for a fuel cell including a humidifying unit that provides moisture contained in water-containing air to dry air to produce humidified air, wherein the humidifying unit includes: a first separator that is in a form of a plate and that includes a dry gas channel in a central region of one surface of the first separator; a second separator that is in a form of a plate and that includes a water-containing gas channel in a central region of a surface of the second separator that faces the dry gas channel; a humidifying membrane that is located between the dry gas channel and the water-containing gas channel, and that provides moisture contained in gas flowing through the water-containing gas channel to the dry air flowing through the dry gas channel to produce the humidified air; two protective films that are provided so as to be stacked on a front and back of the humidifying membrane, and that reinforce the humidifying membrane; and a sealing material that is provided along a first outer edge portion of the humidifying membrane with the humidifying membrane and the protective films stacked together, and that seals between the dry gas channel and the water-containing gas channel. A second outer edge portion of at least one of the protective films is shorter than the first outer edge portion of the humidifying membrane so that the humidifying membrane has a close contact region between the first outer edge portion and the second outer edge portion.

With such a characteristic configuration, the protective films can protect the humidifying membrane and reinforce the mechanical strength of the humidifying membrane. The risk of damage during the manufacturing process can thus be reduced. Moreover, adhesion between the humidifying membrane and the sealing material in the close contact region can be increased, so that leakage between the dry gas channel and the water-containing gas channel via the protective film can be prevented.

It is suitable that a reinforcing member be provided on an opposite side from the humidifying membrane so as to face at least one of the protective films, and that the reinforcing member together with the humidifying membrane and the protective films be sandwiched by the sealing material between the first separator and the second separator.

With such a configuration, even when the pressure of the dry air flowing through the dry gas channel is applied to the humidifying membrane and the protective films, the humidifying membrane and the protective films are less likely to be bent due to the reinforcing member, so that deformation thereof can be reduced.

It is suitable that the reinforcing member be provided in contact with the protective film located between the second separator and the humidifying membrane.

With such a configuration, the humidifying membrane and the protective films are even less likely to be bent, so that deformation thereof can be more effectively reduced.

It is suitable that the humidifying membrane have the close contact region on at least one of surfaces of the humidifying membrane.

With such a configuration, leakage between the dry gas channel and the water-containing gas channel via the protective film can be prevented on the surface of the humidifying membrane on which the close contact region is provided.

It is suitable that the humidifying membrane have the close contact region on the surface that faces the first separator.

With such a configuration, leakage between the dry gas channel and the water-containing gas channel via the protective film can be prevented on the surface of the humidifying membrane on which the close contact region is provided. When the close contact region is provided on the surface of the humidifying membrane that faces the first separator, the humidifying membrane is less likely to be bent and deformed even when there is a pressure difference between the dry air (high pressure) flowing through the dry gas channel and the water-containing air (low pressure) flowing through the water-containing gas channel.

It is suitable that the humidifying membrane and the protective film have a plurality of portions parallel to each other, and that the close contact region have a same width in all of the plurality of parallel portions.

With such a configuration, the distance between the outer edge portion of the protective film and the outer edge portion of the humidifying membrane can be made equal in all of the plurality of parallel portions. Therefore, even if the humidifying membrane expands or contracts due to change in external environment, the protective film can follow such expansion or contraction, so that separation of the protective film can be prevented. Moreover, since the sealing material is uniformly in close contact with the humidifying membrane and the protective film, the humidifying membrane and the protective film are less likely to wrinkle.

It is suitable that at least corners of the outer edge portion of the humidifying membrane have a circular arc shape, and that the width of the close contact region in the corners be equal to the width of the close contact region in the plurality of parallel portions so that the close contact region has the same width in an entire periphery of the humidifying membrane.

With such a configuration, the distance between the outer edge portion of the protective film and the outer edge portion of the humidifying membrane can be made equal in the entire periphery. Therefore, even if the humidifying membrane expands or contracts due to change in external environment, the protective film can follow such expansion or contraction, so that separation of the protective film can be prevented. Since the sealing material is uniformly in close contact with the humidifying membrane and the protective film in the entire periphery, the humidifying membrane and the protective film are less likely to wrinkle.

It is suitable that corners of the second outer edge portion of the protective film have a circular arc shape.

With such a configuration, the distance between the outer edge portion of the protective film and the outer edge portion of the humidifying membrane can be made equal in the entire periphery. Therefore, even if the humidifying membrane expands or contracts due to change in external environment, the protective film can follow such expansion or contraction, so that separation of the protective film can be prevented. Since the sealing material is uniformly in close contact with the humidifying membrane and the protective film in the entire periphery, the humidifying membrane and the protective film are less likely to wrinkle.

BRIEF DESCRIPTION OF THE DRAWINGS

FIG. 1 is a perspective view of a humidifier for a fuel cell.

FIG. 2 is a diagram showing flow paths communicating with the humidifier for a fuel cell.

FIG. 3 is a partial side sectional view of a humidifying unit according to a first embodiment.

FIG. 6 is a partial side sectional view of a humidifying unit according to a second embodiment.

MODES FOR CARRYING OUT THE INVENTION

Figure 4:
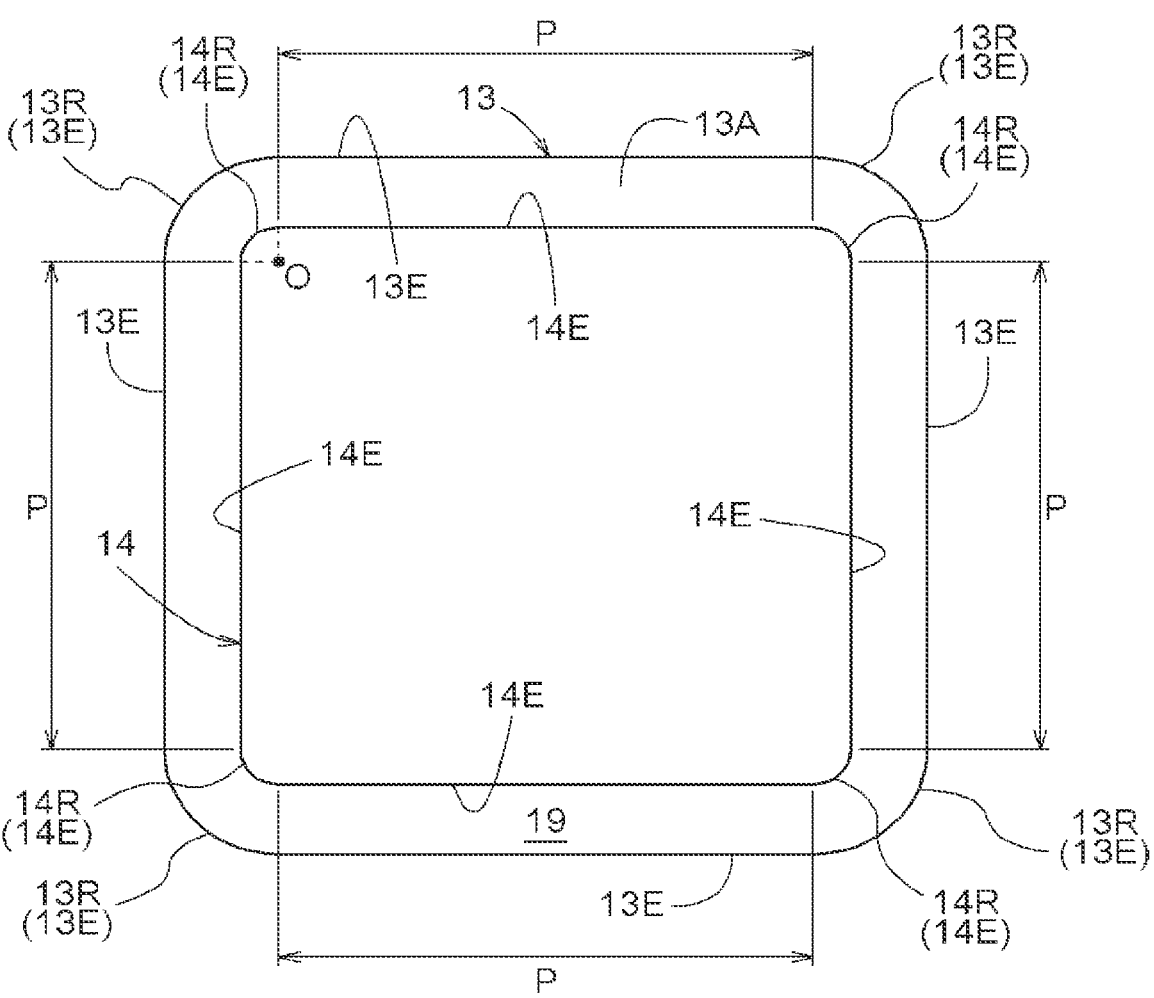
FIG. 4 is a plan view of a protective film provided on a humidifying membrane.

A humidifier for a fuel cell (hereinafter referred to as "humidifier") according to the present invention is configured to protect and reinforce a humidifying membrane. A humidifier 1 of an embodiment will be described below.

First Embodiment

Figure 1:
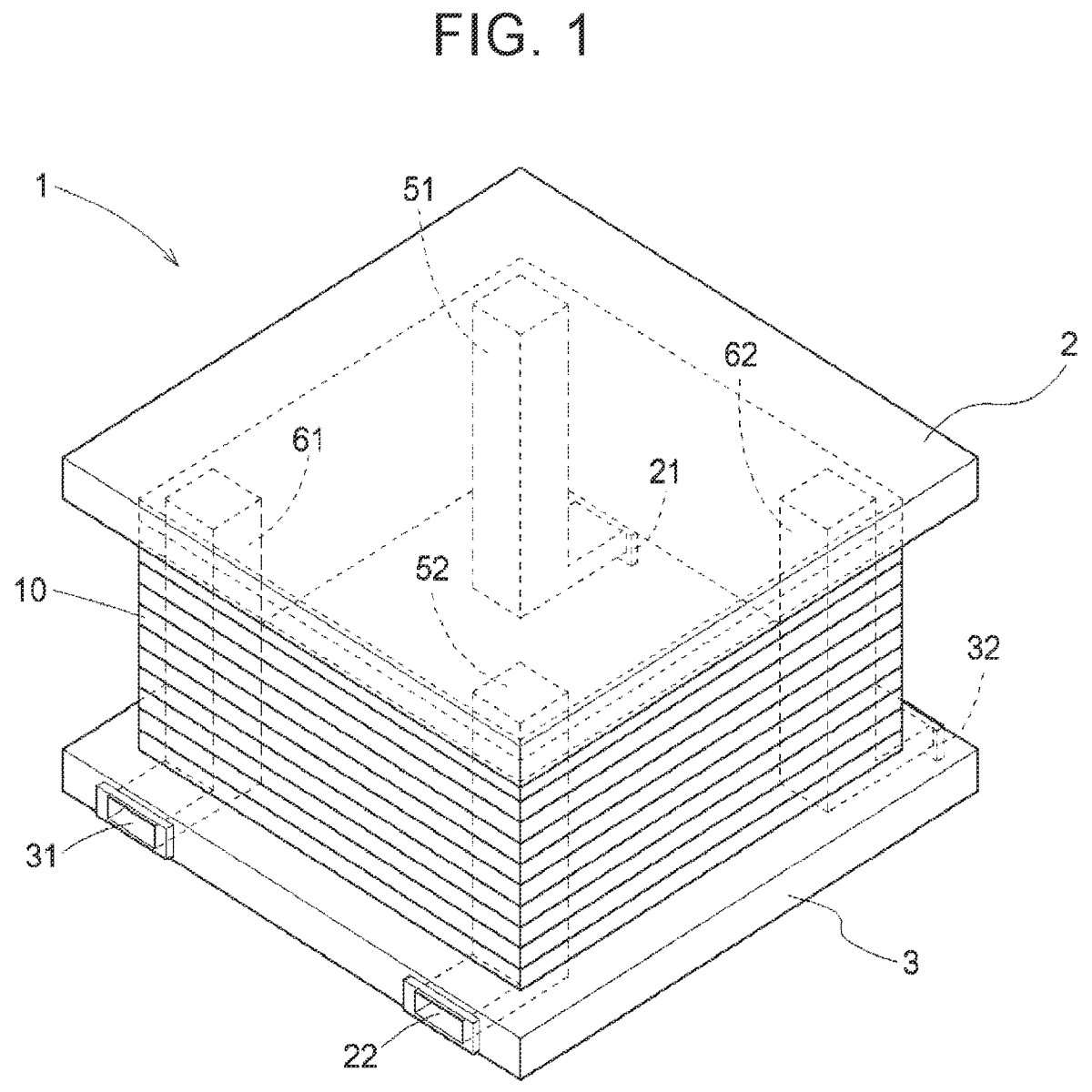
Figure 2:
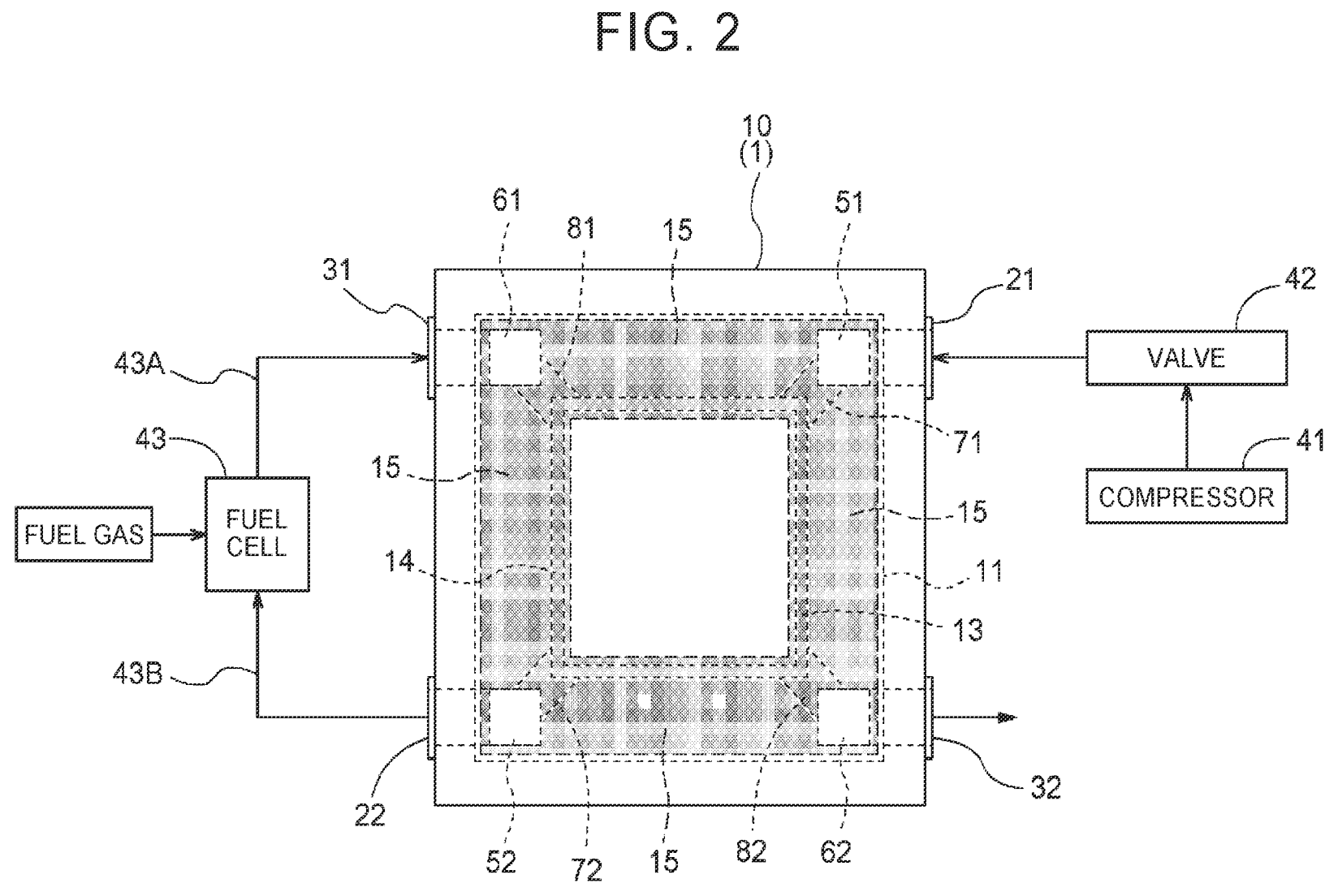
Figure 3:
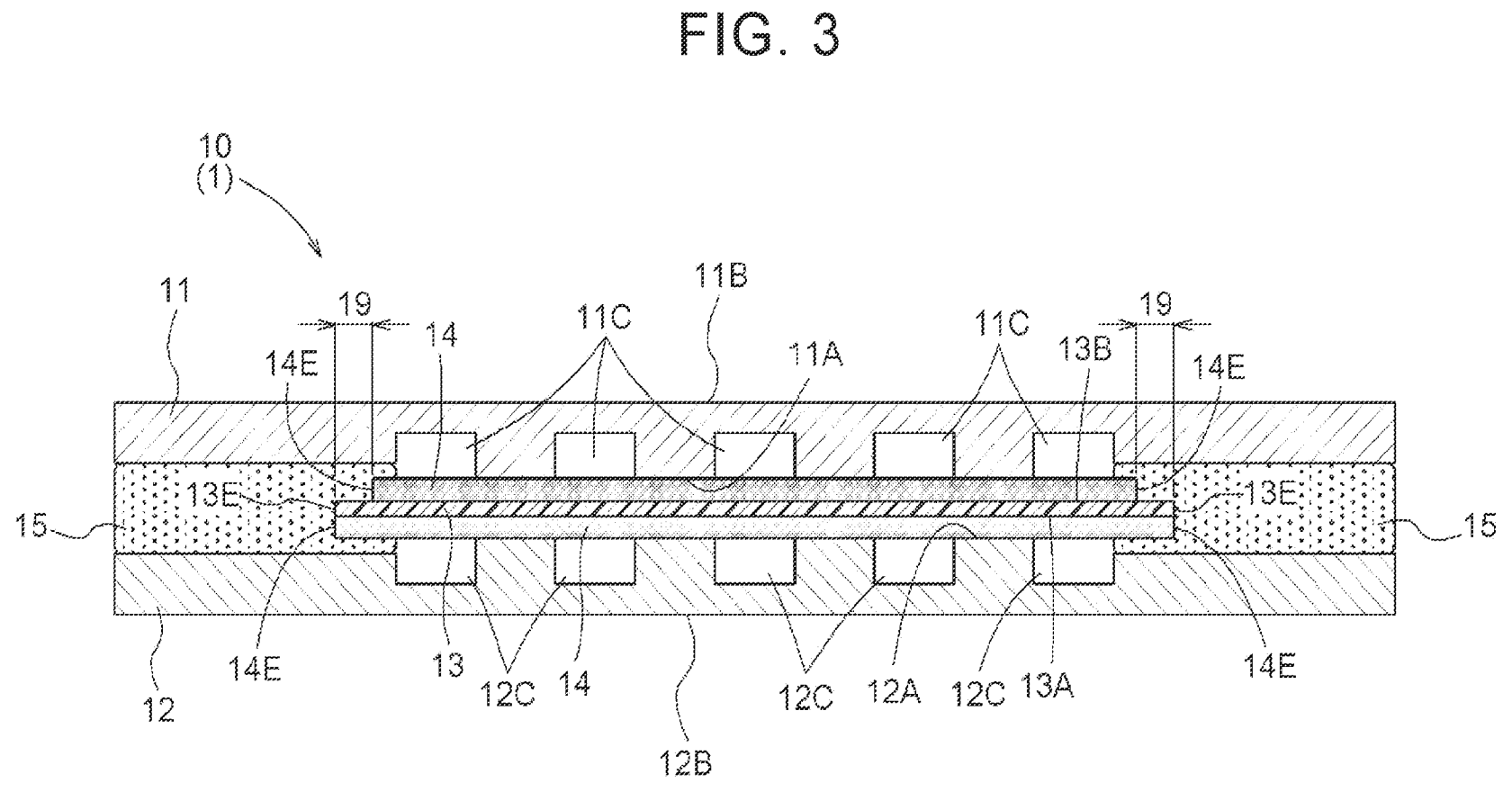

FIG. 1 is a perspective view of a humidifier 1 according to a first embodiment. FIG. 2 is a diagram showing flow paths communicating with the humidifier 1. FIG. 3 is a side sectional view of part of a humidifying unit 10. The humidifier 1 includes a first plate 2, a second plate 3, and the humidifying unit 10. The humidifying unit 10 is provided so as to be sandwiched between the first plate 2 and the second plate 3. As will be described in detail later, the humidifying unit 10 provides moisture contained in water-containing air to dry air to produce humidified air. As shown in FIG. 3, the humidifying unit 10 is composed of a stack of a first separator 11, a second separator 12, a humidifying membrane 13, and protective films 14. The humidifying unit 10 is provided in such a manner that the second separator 12, the protective film 14, the humidifying membrane 13, the protective film 14, and the first separator 11 are stacked in this order between the first plate 2 and the second plate 3, with the stack being pressed in the stacking direction. The humidifying unit 10 is composed of a stack of a plurality of the stacks shown in FIG. 3.

As shown in FIG. 2, the humidifier 1 is provided with a dry gas supply port 21, a humidified gas discharge port 22, a water-containing gas supply port 31, and a water-containing gas discharge port 32. In the present embodiment, the humidifying unit 10 has a quadrilateral shape as viewed in plan. The dry gas supply port 21 and the humidified gas discharge port 22 are located so as to face each other along a diagonal line of the quadrilateral shape, and the water-containing gas supply port 31 and the water-containing gas discharge port 32 are located so as to face each other along a diagonal line of the quadrilateral square.

In the present embodiment, air (example of "dry air") compressed by a compressor 41 is supplied to the dry gas supply port 21 of the humidifier 1 via a valve 42. The dry air supplied to the dry gas supply port 21 is humidified while flowing through dry gas channels 11C that will be described later, and is discharged as humidified air from the humidified gas discharge port 22. The humidified air discharged from the humidified gas discharge port 22 is introduced into a cathode gas supply path 43B and supplied to a fuel cell 43. The fuel cell 43 is supplied with fuel gas containing hydrogen gas and air containing oxygen gas (corresponding to the above "dry air") and generates electricity. By this power generation, the fuel cell 43 discharges water-containing gas (example of "water-containing air") containing a large amount of water in the form of water vapor. This water-containing gas is supplied to the water-containing gas supply port 31 through a cathode off-gas discharge path 43A. The water-containing gas supplied to the water-containing gas supply port 31 humidifies the dry air flowing through the dry gas channels 11C as it flows through water-containing gas channels 12C that will be described later. The water-containing gas is then discharged from the water-containing gas discharge port 32.

As shown in FIG. 3, the first separator 11 has the dry gas channels 11C in a central region of its one surface. The first separator 11 is in the form of a plate. Of a front surface 11A and a back surface 11B out of the surfaces of the plate-like first separator 11, the one surface is the front surface 11A. Therefore, when the first separator 11 is divided into an outer peripheral portion and a central portion as viewed in plan, the central region of the one surface is the region of the central portion. Accordingly, the first separator 11 has the dry gas channels 11C in the central region of the front surface 11A as viewed in plan. A sealing material 15, which will be described later, is provided on the outer peripheral portion of the front surface 11A of the first separator 11, as viewed in plan. In order to facilitate understanding, in the present embodiment, the region of the front surface 11A where the sealing material 15 is provided is defined as the outer peripheral portion, and the region of the front surface 11A where the dry gas channels 11C are formed is defined as the central portion, as viewed in plan. Although only one first separator 11 is shown in FIG. 3, the humidifying unit 10 includes a plurality of the first separators 11, and as shown in FIG. 2, their dry gas channels 11C are configured to communicate with the dry gas supply port 21 through a dry gas supply path 51 and a supply port 71. With this configuration, the dry air from the compressor 41 can be introduced into the dry gas channels 11C as described above. The first separator 11 may have the dry gas channels 11C or the water-containing gas channels 12C in the central region of the back surface 11B, in addition to the front surface 11A.

The second separator 12 has the water-containing gas channels 12C in a central region of one surface thereof. The second separator 12 is in the form of a plate. Of a front surface 12A and a back surface 12B out of the surfaces of the plate-like second separator 12, the one surface is the front surface 12A. Therefore, when the second separator 12 is divided into an outer peripheral portion and a central portion as viewed in plan, the central region of the one surface is the region of the central portion. Accordingly, the second separator 12 has the water-containing gas channels 12C in the central region of the front surface 12A as viewed in plan. The sealing material 15, which will be described later, is also provided on the outer peripheral portion of the front surface 12A of the second separator 12, as viewed in plan. In order to facilitate understanding, in the present embodiment, the region of the front surface 12A where the sealing material 15 is provided is defined as the outer peripheral portion, and the region of the front surface 12A where the water-containing gas channels 12C are formed is defined as the central portion, as viewed in plan. Although only one second separator 12 is shown in FIG. 3, the humidifying unit 10 also includes a plurality of the second separators 12, and as shown in FIG. 2, their water-containing gas channels 12C are configured to communicate with the water-containing gas supply port 31 through a water-containing gas supply path 61 and a supply port 81. With this configuration, the water-containing gas from the fuel cell 43 can be introduced. The second separator 12 may have the water-containing gas channels 12C or the dry gas channels 11C in the central region of the back surface 12B, in addition to the front surface 12A.

As shown in FIG. 3, the humidifying membrane 13 is located between the dry gas channels 11C and the water-containing gas channels 12C in the stacking direction. "Between the dry gas channels 11C and the water-containing gas channels 12C" means between the central region of the first separator 11 and the central region of the second separator 12 described above. Therefore, the humidifying membrane 13 is located between the central region of the first separator 11 and the central region of the second separator 12. That is, the dry gas channels 11C and the water-containing gas channels 12C face each other with the humidifying membrane 13 interposed therebetween. The humidifying unit 10 also includes a plurality of the humidifying membranes 13.

Such a humidifying membrane 13 provides moisture contained in the gas flowing through the water-containing gas channels 12C to the dry air flowing through the dry gas channels 11C to produce humidified air. The dry air flowing through the dry gas channels 11C is dry gas supplied from the compressor 41 to the dry gas channels 11C through the valve 42, the dry gas supply port 21, and the dry gas supply path 51. The gas flowing through the water-containing gas channels 12C is water-containing gas supplied from the cathode off-gas discharge path 43A to the water-containing gas channels 12C. Therefore, the humidifying membrane 13 provides moisture contained in the water-containing gas flowing from the fuel cell 43 through the cathode off-gas discharge path 43A and the water-containing gas supply port 31 to the dry gas supplied from the compressor 41 through the valve 42, the dry gas supply port 21, and the dry gas supply path 51 to produce humidified air. Since the method of providing moisture to dry air to produce humidified gas (example of "humidified air") is well known in the art, description thereof will be omitted. The humidified gas thus produced is introduced into the cathode gas supply path 43B through a humidified air discharge path 52 and the humidified gas discharge port 22 and is supplied to the fuel cell 43.

As shown in FIG. 3, the protective films 14 are provided so as to be stacked on the humidifying membrane 13, and reinforce the humidifying membrane 13. "Provided so as to be stacked on the humidifying membrane 13" means that the protective film 14 is provided so as to be bonded to at least either a first surface 13A that is a front surface of the humidifying membrane 13 and a second surface 13B that is a back surface of the humidifying membrane 13. In the present embodiment, the protective film 14 is provided on both the first surface 13A and the second surface 13B (front and back) of the humidifying membrane 13. For example, nonwoven fabric is used as the protective film 14. However, the protective film 14 is not limited to this, and paper, mesh, a porous film, etc. can be used. The protective film 14 can thus protect the humidifying membrane 13 that is a thin membrane (e.g., several micrometers thick) and reinforce the mechanical strength of the humidifying membrane 13, and can improve ease of handling in, for example, a manufacturing process and prevent damage.

The protective films 14 are provided in such a manner that an outer edge portion (example of the second outer edge portion) 14E of at least one of the protective films 14 is withdrawn toward the central portion of the humidifying membrane 13 with respect to an outer edge portion (example of the first outer edge portion) 13E of the humidifying membrane 13. The outer edge portion 14E of the protective film 14 is an edge portion (outer end portion) in the outer peripheral portion of the protective film 14 described above. "Withdrawn toward the central portion of the humidifying membrane 13" means that, as shown in FIG. 4, the humidifying membrane 13 is exposed around the outer edge portion 14E of the protective film 14 when the protective film 14 provided so as to be stacked on the humidifying membrane 13 is viewed in plan. At this time, the outer peripheral length of the outer edge portion 14E of the protective film 14 is smaller than the outer peripheral length of the outer edge portion 13E of the humidifying membrane 13. In the present embodiment, the exposed portion of the humidifying membrane 13 between the outer edge portion 13E of the humidifying membrane 13 and the outer edge portion 14E of the protective film 14 is referred to as "close contact region 19." In the present embodiment, the protective film 14 is provided on both the first surface 13A and the second surface 13B of the humidifying membrane 13, as described above. Of the protective films 14 provided on both the first surface 13A and the second surface 13B of the humidifying membrane 13, the protective film 14 on the second surface 13B is provided so as to be withdrawn toward the central portion of the humidifying membrane 13. On the other hand, the protective film 14 on the first surface 13A of the humidifying membrane 13 is provided in such a manner that the outer edge portion 14E of the protective film 14 is not withdrawn toward the central portion of the humidifying membrane 13 with respect to the outer edge portion 13E of the humidifying membrane 13. In the present embodiment, the protective film 14 on the first surface 13A of the humidifying membrane 13 is provided in such a manner that the outer edge portion 14E is aligned with the outer edge portion 13E of the humidifying membrane 13. The protective film 14 may protrude beyond the outer edge portion 13E of the humidifying membrane 13, as necessary.

The sealing material 15 is provided along the outer edge portion 13E of the humidifying membrane 13 in such a manner that the sealing material 15 sandwiches the humidifying membrane 13 and the protective films 14. Specifically, the sealing material 15 is provided on the outer peripheral portion of the one surface (front surface 11A) of the first separator 11 except for the dry gas supply path 51 and the humidified air discharge path 52 for the dry gas channels 11C, and is also provided on the outer peripheral portion of the one surface (front surface 12A) of the second separator 12 other than the water-containing gas supply path 61 and a water-containing air discharge path 62 for the water-containing gas channels 12C. In the present embodiment, "sandwich the humidifying membrane 13 and the protective films 14" refers to the state in which the sealing material 15 is located between the protective film 14 and the first separator 11 and between the protective film 14 and the second separator 12 so that the humidifying membrane 13 and the protective films 14 are separated from the outer peripheral portion of the first separator 11 and the outer peripheral portion of the second separator 12. The supply port 71 for the dry gas channels 11C in the outer peripheral portion of the one surface of the first separator 11 is a port that communicates with the dry gas supply path 51 and through which the dry gas is supplied to the dry gas channels 11C, and a discharge port 72 in the outer peripheral portion of the one surface of the first separator 11 is a port that communicates with the humidified air discharge path 52 and through which the humidified air is discharged from the dry gas channels 11C. The supply port 81 for the water-containing gas channels 12C in the outer peripheral portion of the one surface of the second separator 12 is a port that communicates with the water-containing gas supply path 61 and through which the water-containing gas is supplied to the water-containing gas channels 12C, and a discharge port 82 in the outer peripheral portion of the one surface of the second separator 12 is a port that communicates with the water-containing air discharge path 62 and through which the water-containing air is discharged from the water-containing gas channels 12C.

In the present embodiment, the sealing material 15 is provided in the entire periphery other than the dry gas supply path 51, the humidified air discharge path 52, the water-containing gas supply path 61, and the water-containing air discharge path 62 in such a manner that the humidifying membrane 13 and the protective films 14 are separated from the first separator 11 and the second separator 12. The sealing material 15 is shown in gray in FIG. 2. As shown in FIG. 3, the sealing material 15 is provided such that its outer edge is flush with the outer edges of the first separator 11 and the second separator 12. In FIG. 2, the outer edge of the sealing material 15 is shown located slightly inward of the outer edges of the first separator 11 and the second separator 12. However, the outer edge of the sealing material 15 actually is flush with the outer edges of the first separator 11 and the second separator 12. For example, an adhesive can be used as such a sealing material 15.

The sealing material 15 is provided so as to be in direct contact with the humidifying membrane 13 in the close contact region 19 of the humidifying membrane 13 between the outer edge portion 13E of the humidifying membrane 13 and the outer edge portion 14E of the protective film 14. Accordingly, even if the protective film 14 has voids in the thickness direction of the protective film 14, airtightness between the sealing material and the humidifying membrane 13 is improved and sealing is provided between the dry gas channels 11C and the water-containing gas channels 12C, so that the risk of leakage (cross leakage) of air (dry air and humidified air) from the dry gas channels 11C to the water-containing gas channels 12C can be reduced.

The close contact region 19 of the humidifying membrane 13 is provided on at least either the first surface 13A that is the front surface of the humidifying membrane 13 and the second surface 13B that is the back surface of the humidifying membrane 13. In the present embodiment, the protective film 14 is provided on both the first surface 13A and the second surface 13B of the humidifying membrane 13, but the close contact region 19 is provided only on the second surface 13B. Normally, the dry air flowing through the dry gas channels 11C has been compressed by the compressor 41, and therefore has a higher pressure than the water-containing air flowing through the water-containing gas channels 12C. Accordingly, providing the close contact region 19 on the second surface 13B that is subjected to the pressure of the dry air is suitable because the humidifying membrane 13 is less likely to be bent and deformed even when there is a pressure difference between the dry air (high pressure) flowing through the dry gas channels 11C and the water-containing air (low pressure) flowing through the water-containing gas channels 12C. It should be understood that the close contact region 19 may be provided on both the first surface 13A and the second surface 13B, or may be provided only on the first surface 13A. Moreover, in the case where the protective film 14 is provided on only either the first surface 13A or the second surface 13B of the humidifying membrane 13, and the outer edge portion 14E of the protective film 14 placed on only one surface of the humidifying membrane 13 is aligned with, or protrudes beyond, the outer edge portion 13E of the humidifying membrane 13, the close contact region 19 may be provided on the opposite surface of the humidifying membrane 13 from the surface on which the protective film 14 is provided.

FIG. 4 shows in plan the humidifying membrane 13 and the protective film 14 provided on the second surface 13B of the humidifying membrane 13 in such a manner that the outer edge portion 14E is withdrawn toward the central portion of the humidifying membrane 13 with respect to the outer edge portion 13E of the humidifying membrane 13. In the present embodiment, the humidifying membrane 13 and the protective film 14 provided in the withdrawn state are configured to have a plurality of (in the present embodiment, four) portions that are parallel to each other. In FIG. 4, such parallel portions are denoted by sign P. The distance between the outer edge portion 13E of the humidifying membrane 13 and the outer edge portion 14E of the protective film 14 as viewed in plan (width of the close contact region 19) can thus be made equal in the plurality of parallel portions P. The supply port 71, the discharge port 72, the supply port 81, and the discharge port 82 are formed in the corners of the humidifying membrane 13 and the protective film 14 that are portions that are not parallel (not denoted by sign P) (see also FIG. 2). The distance between the outer edge portion 13E of the humidifying membrane 13 and the outer edge portion 14E of the protective film 14 provided with the sealing material 15 as viewed in plan (width of the close contact region 19) is the same in the entire periphery. Therefore, even if the humidifying membrane 13 expands or contracts due to change in external environment, the protective film 14 can follow such expansion or contraction, so that damage to (e.g., breakage of) the protective film 14 and the humidifying membrane 13 can be prevented. Since the sealing material 15 is uniformly in close contact with the humidifying membrane 13 and the protective film 14 in the entire periphery, the humidifying membrane 13 and the protective film 14 are less likely to wrinkle.

Figure 5:
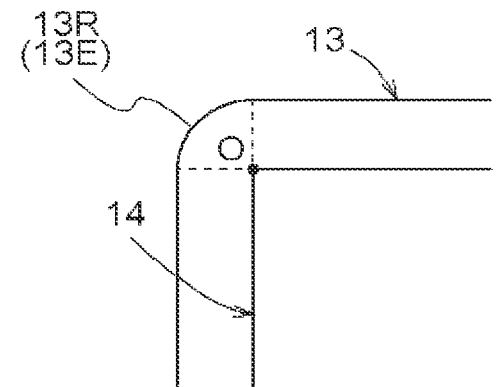
FIG. 5 is another example of the protective film provided on the humidifying membrane.

Moreover, in the present embodiment, as shown in FIGS. 4 and 5, at least corners 13R of the outer edge portion 13E of the humidifying membrane 13 are formed in a circular arc shape as viewed in plan. When part of the corners 13R of the outer edge portion 13E of the humidifying membrane 13 does not overlap the supply port 71, the discharge port 72, the supply port 81, and the discharge port 82, or when the supply port 71, the discharge port 72, the supply port 81, and the discharge port 82 are formed in portions other than the corners 13R (portions denoted by sign P), the sealing material 15 can be more easily provided on the corners 13R. Therefore, it is preferable that the distance between the outer edge portion 13E of the humidifying membrane 13 and the outer edge portion 14E of the protective film 14 (width of the close contact region 19) be the same in the corners 13R as well. That is, it is preferable to form the protective film 14 in a rectangular shape so that the centers O of the circular arcs of the corners 13R of the humidifying membrane 13 are located at the vertexes of the protective film 14 (see FIG. 5), or to form corners 14R of the outer edge portion 14E of the protective film 14 in a circular arc shape so that the centers O of the corners 13R of the humidifying membrane 13 match the centers O of the corners 14R of the protective film 14 (see FIG. 4). With this configuration, the width of the close contact region 19 where the humidifying membrane 13 is exposed (distance between the outer edge portion 13E of the humidifying membrane 13 and the outer edge portion 14E of the protective film 14) when the protective film 14 provided so as to be stacked on the humidifying membrane 13 is viewed in plan can be made equal in the entire periphery of the humidifying membrane 13 and the protective film 14 including the supply port 71, the discharge port 72, the supply port 81, and the discharge port 82 (not shown in FIG. 4).

Second Embodiment

Next, the humidifier 1 according to a second embodiment will be described. In the description of the present embodiment, the portions having the same configuration as in the first embodiment are denoted by the same signs as in the first embodiment, and description of the same configuration will be omitted. The humidifier 1 according to the present embodiment is different from the first embodiment in the configuration of the humidifying unit 10.

Figure 6:
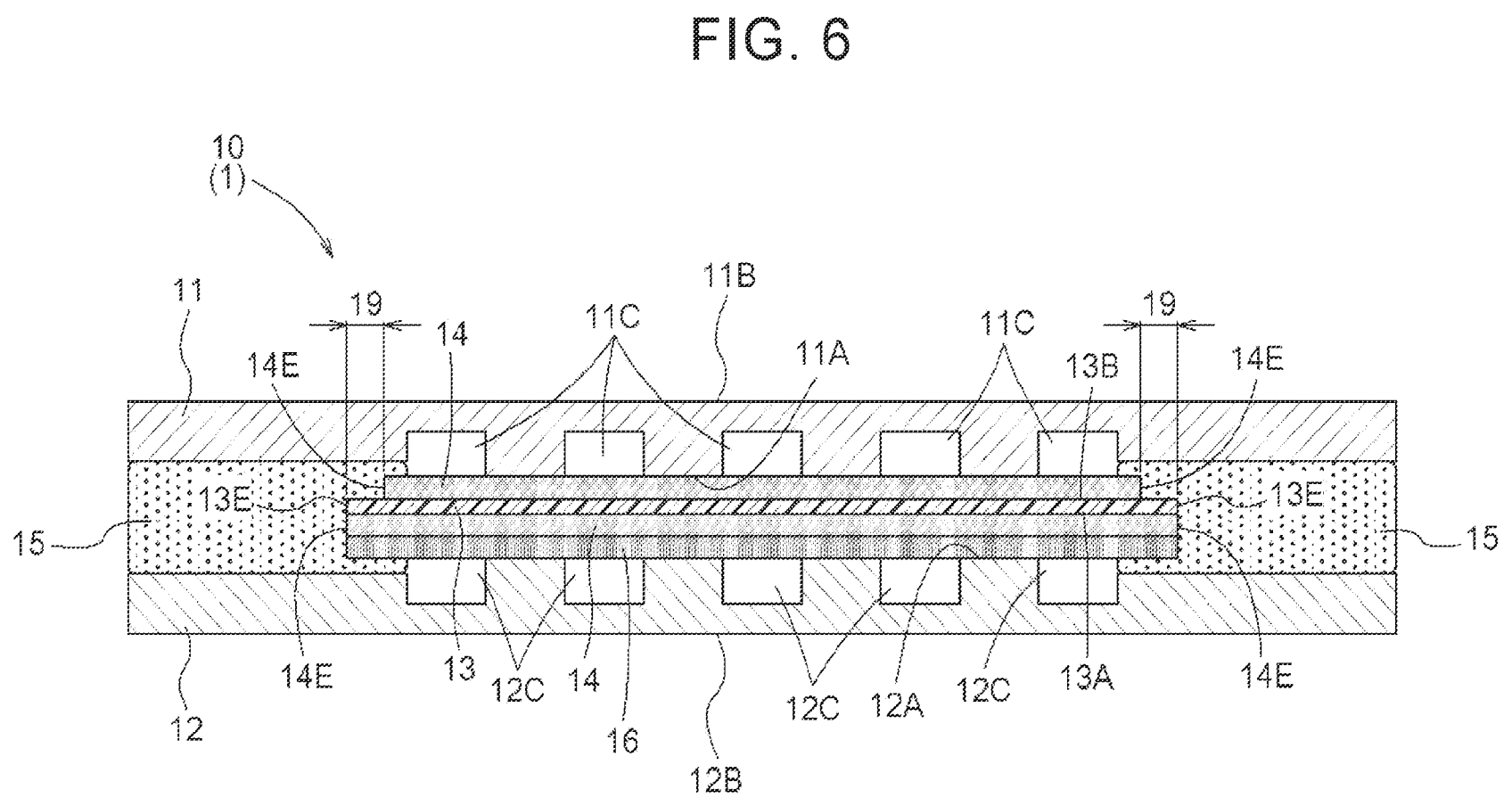

As shown in FIG. 6, in the present embodiment, a reinforcing member 16 is provided between the second separator 12 and the protective film 14 provided on the first surface 13A of the humidifying membrane 13. That is, the reinforcing member 16 is stacked on the opposite side from the humidifying membrane 13 so as to face the protective film 14 provided on the first surface 13A of the humidifying membrane 13. The reinforcing member 16 and the protective film 14 are disposed in contact with each other. In the present embodiment, the reinforcing member 16 has the same size as the humidifying membrane 13 and the protective film 14 facing (adjacent to) the reinforcing member 16. On the other hand, the protective film 14 on the second surface 13B of the humidifying membrane 13 is provided so as to be withdrawn toward the central portion of the humidifying membrane 13, so that the humidifying membrane 13 has the close contact region 19 only on the second surface 13B. For example, resin mesh is used as the reinforcing member 16. However, the reinforcing member 16 is not limited to this, and paper, nonwoven fabric, a porous film, etc. can be used. In the present embodiment, the protective film 14 and the reinforcing member 16 are entirely in contact with each other. However, the protective film 14 and the reinforcing member 16 may be configured to be only partially in contact with each other, for example, only in their central regions.

The sealing material 15 is provided along the outer edge portion 13E of the humidifying membrane 13 in such a manner that the sealing material 15 sandwiches the humidifying membrane 13, the protective films 14 on both sides thereof, and the reinforcing member 16. In the present embodiment, "sandwich the humidifying membrane 13, the protective films 14 on both sides thereof, and the reinforcing member 16" refers to the state in which the sealing material 15 is located between the protective film 14 on the second surface 13B of the humidifying membrane 13 and the first separator 11 and between the reinforcing member 16 and the second separator 12 so that the humidifying membrane 13, the protective films 14 on both sides thereof, and the reinforcing member 16 are separated from the outer peripheral portion of the first separator 11 and the outer peripheral portion of the second separator 12.

Normally, the dry air flowing through the dry gas channels 11C has been compressed by the compressor 41, and therefore has a higher pressure than the water-containing air flowing through the water-containing gas channels 12C, as described above. Therefore, even when the protective films 14 are provided, the humidifying membrane 13 may be bent and deformed due to the pressure difference between the dry air flowing through the dry gas channels 11C and the water-containing air flowing through the water-containing gas channels 12C. Providing the reinforcing member 16 increases the tensile strengths of the humidifying membrane 13 and the protective films 14. Therefore, even when the pressure of the dry air is applied, the humidifying membrane 13 and the protective films 14 are less likely to be bent, so that deformation thereof can be reduced.

In the present embodiment, the reinforcing member 16 is provided between the second separator 12 and the protective film 14 on the first surface 13A of the humidifying membrane 13. However, the reinforcing member 16 may be provided between the first separator 11 and the protective film 14 on the second surface 13B of the humidifying membrane 13, or two reinforcing members 16 may be provided so as to face both protective films 14. In the present embodiment, the reinforcing member 16 has the same size as the humidifying membrane 13 and the protective film 14 facing the reinforcing member 16.

Contrary to FIG. 6, in the case where the protective film 14 on the second surface 13B of the humidifying membrane 13 has the same size as the humidifying membrane 13 and the protective film 14 on the first surface 13A of the humidifying membrane 13 is provided so as to be withdrawn toward the central portion of the humidifying membrane 13 so that the humidifying membrane 13 has the close contact region 19 only on the first surface 13A, the reinforcing member 16 having the same size as the protective film 14 on the second surface 13B of the humidifying membrane 13, namely having the same size as the humidifying membrane 13, may be provided between the first separator 11 and the protective film 14 on the second surface 13B of the humidifying membrane 13.

Modifications of First Embodiment and Second Embodiment

Figure 7:
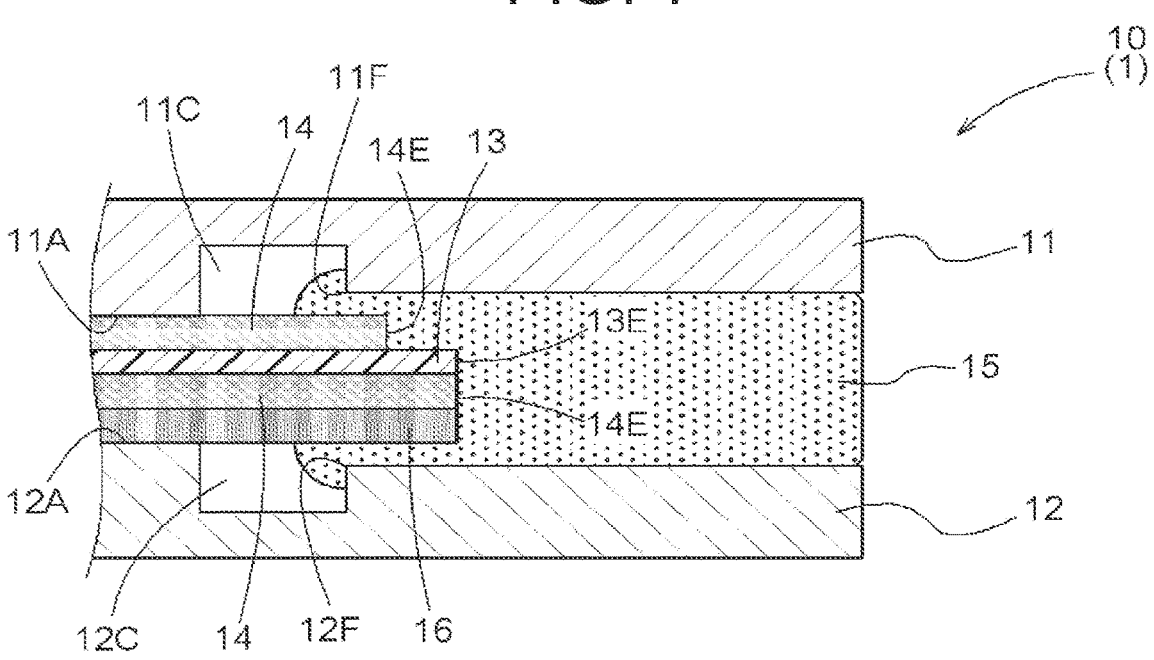
FIG. 7 is a partial side sectional view of a humidifying unit according to a modification.
Figure 8:
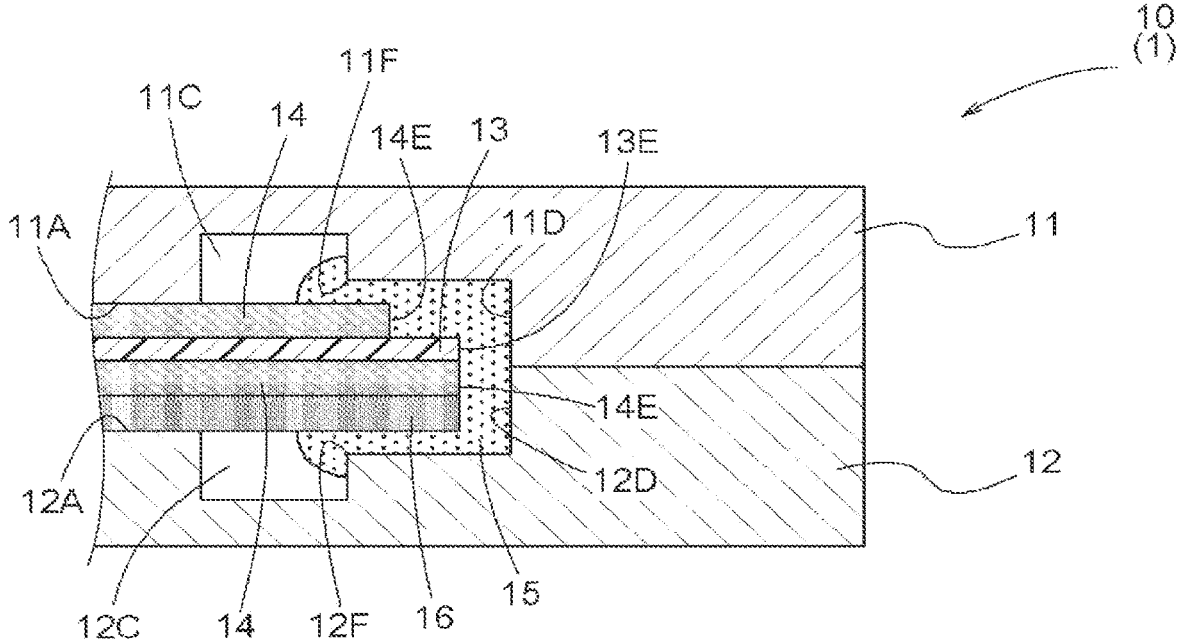
FIG. 8 is a partial side sectional view of a humidifying unit according to a modification.
Figure 9:
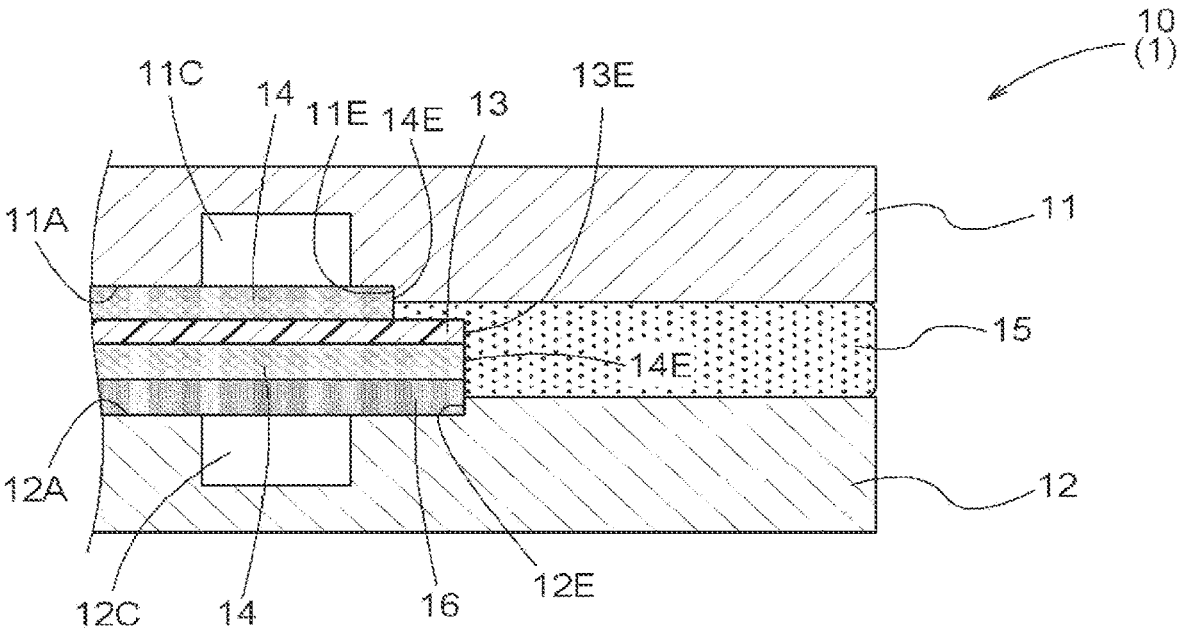
FIG. 9 is a partial side sectional view of a humidifying unit according to a modification.
Figure 10:
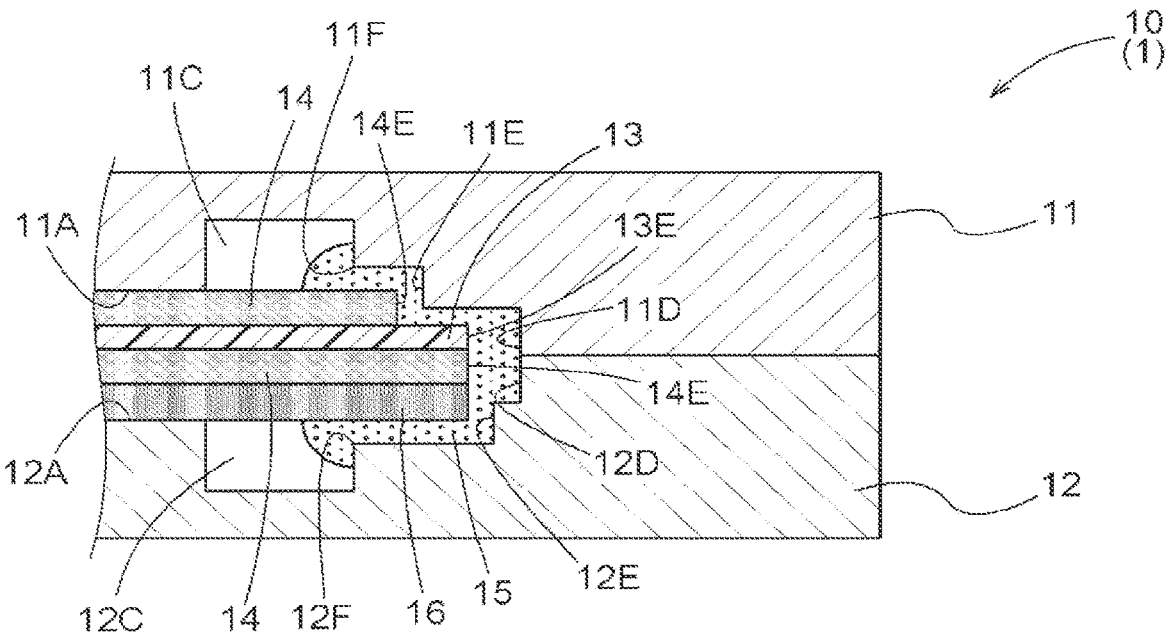
FIG. 10 is a partial side sectional view of a humidifying unit according to a modification.

The following modifications will be described with reference to the drawing of the second embodiment, but can also be similarly applied to the first embodiment.
  (1) As shown in FIG. 7, in the configuration of the second embodiment, the sealing material 15 covers an edge 11F of the first separator 11 that forms the dry gas channel 11C and an edge 12F of the second separator 12 that forms the water-containing gas channel 12C. The protective films 14 and the reinforcing member 16 can thus be prevented from being torn due to them getting caught on the edges 11F, 12F.
  (2) As shown in FIG. 8, a wall 11D is formed in the outer edge of the first separator 11 and a wall 12D is formed in the outer edge of the second separator 12 so that the walls 11D, 12D are in contact with each other. In addition, the sealing material 15 is provided so as to cover the edges 11F, 12F as in (1) described above. The sealing material can thus be prevented from leaking to the outside of the first separator 11 and the second separator 12, and the protective films 14 and the reinforcing member 16 can be prevented from being torn by the edges 11F, 12F.
  (3) As shown in FIG. 9, steps 11E, 12E are provided in the outer peripheral portion of the first separator 11 and the outer peripheral portion of the second separator 12, respectively, so that the protective film 14 is located in the step 11E and the reinforcing member 16 is located in the step 12E. The humidifying membrane 13, the protective films 14, and the reinforcing member 16 can thus be easily positioned with respect to the first separator 11 and the second separator 12.
  (4) As shown in FIG. 10, the steps 11E, 12E in (3) described above are increased in size to allow the sealing material 15 to flow therein so that this sealing material covers the edge 11F of the first separator 11 that forms the dry gas channel 11C and the edge 12F of the second separator 12 that forms the water-containing gas channel 12C. Moreover, the wall 11D is formed in the outer edge of the first separator 11 and the wall 12D is formed in the outer edge of the second separator 12 so that the walls 11D, 12D are in contact with each other. The protective films 14 and the reinforcing member 16 can thus be prevented from being torn by the edges 11F, 12F, and the sealing material 15 can be prevented from leaking to the outside of the first separator 11 and the second separator 12. Furthermore, with the steps 11E, 12E, the humidifying membrane 13, the protective films 14, and the reinforcing member 16 can be easily positioned with respect to the first separator 11 and the second separator 12.

Other Embodiments

In the above embodiments, the humidifying membrane 13 and the protective film 14 are described as having the portions P parallel to each other. However, the humidifying membrane 13 and the protective film 14 may be structured so as not to have the portions P parallel to each other.

In the above embodiments, at least the corners 13R of the outer edge portion 13E of the humidifying membrane 13 are described as being formed in a circular arc shape. However, the corners 13R of the outer edge portion 13E of the humidifying membrane 13 may not be formed in a circular arc shape. In this case, only the corners 14R of the outer edge portion 14E of the protective film 14 may be formed in a circular arc shape.

The above embodiments illustrate examples in which the humidifying membrane 13 and the protective films 14 are formed in a quadrilateral shape. However, the humidifying membrane 13 and the protective films 14 may have a triangular shape, or may be formed in a polygonal shape with five or more sides. Alternatively, the humidifying membrane 13 and the protective films 14 may be formed in a circular shape.

In the above embodiments, in the central region that is the region located inside the region where the sealing material 15 is provided, the surface 11A of each partition wall that separates adjacent dry gas channels 11C, 11C of the first separator 11 from each other and the surface 12A of each partition wall that separates adjacent water-containing gas channels 12C, 12C of the second separator 12 from each other are in contact with the protective film 14 or the reinforcing member 16 (see FIGS. 3 and 6 to 10). However, there may be clearance between either or both of the surfaces 11A, 12A of the partition walls and the protective film 14 or the reinforcing member 16. Moisture in the gas flowing through the water-containing gas channels 12C can thus be supplied to the dry air flowing through the dry gas channels 11C even in portions facing the surfaces 11A, 12A of the partition walls.

The configurations according to the above embodiments and modifications can be combined in any way possible.

The present invention can be used for humidifiers for fuel cells that include a humidifying unit for providing moisture contained in water-containing air to dry air to produce humidified air.

DESCRIPTION OF THE REFERENCE NUMERALS

1: Humidifier (Humidifier for Fuel Cell)
10: Humidifying Unit
11: First Separator
11A: Front Surface (One Surface)
11C: Dry Gas Channel
12: Second Separator
12A: Front Surface (One Surface)
12C: Water-Containing Gas Channel
13: Humidifying Membrane
13E: Outer Edge Portion (First Outer Edge Portion)
13R: Corner
14: Protective Film
14E: Outer Edge Portion (Second Outer Edge Portion)

15: Sealing Material
16: Reinforcing Member
19: Close Contact Region
71: Supply Port
72: Discharge Port
81: Supply Port
82: Discharge Port
P: Parallel Portion

The invention claimed is:

1. A humidifier for a fuel cell, the humidifier comprising a humidifying unit that provides moisture contained in water-containing air to dry air to produce humidified air, wherein the humidifying unit includes a first separator that is in a form of a plate and that includes a dry gas channel in a central region of one surface of the first separator, a second separator that is in a form of a plate and that includes a water-containing gas channel in a central region of a surface of the second separator that faces the dry gas channel, a humidifying membrane that is located between the dry gas channel and the water-containing gas channel, and that provides moisture contained in gas flowing through the water-containing gas channel to the dry air flowing through the dry gas channel to produce humidified air, two protective films that reinforce the humidifying membrane, the protective films include a first protective film stacked respectively on a front of the humidifying membrane and a second protective film stacked on a back of the humidifying membrane, and a sealing material that is provided along a first outer edge portion of the humidifying membrane with the humidifying membrane and the protective films stacked together, and that seals between the dry gas channel and the water-containing gas channel, a second outer edge portion of one of the first protective film of the second protective film is shorter than the first outer edge portion of the humidifying membrane so that the humidifying membrane has a close contact region between the first outer edge portion and the second outer edge portion, a third outer edge portion of the other of the first protective film and the second protective film aligns with the first outer edge portion of the humidifying membrane, and the sealing material is provided along the second outer edge portion, the third outer edge portion, a surface of the humidifying membrane between the first outer edge portion and the second outer edge portion, and a surface of the one of the first protective film and the second protective film that is opposite to the humidifying membrane.

2. The humidifier for a fuel cell according to claim 1, wherein a reinforcing member is provided on an opposite side from the humidifying membrane so as to face at least one of the protective films, and the reinforcing member together with the humidifying membrane and the protective films is sandwiched by the sealing material between the first separator and the second separator.

3. The humidifier for a fuel cell according to claim 2, wherein the reinforcing member is provided in contact with the protective film located between the second separator and the humidifying membrane.

4. The humidifier for a fuel cell according to claim 1, wherein the humidifying membrane has the close contact region on at least one of surfaces of the humidifying membrane.

5. The humidifier for a fuel cell according to claim 4, wherein the humidifying membrane has the close contact region on a surface that faces the first separator.

6. The humidifier for a fuel cell according to claim 1, wherein the humidifying membrane and the protective films have a plurality of portions parallel to each other, and the close contact region has a same width in all of the plurality of parallel portions.

7. The humidifier for a fuel cell according to claim 6, wherein at least corners of the first outer edge portion of the humidifying membrane have a circular arc shape, and a width of the close contact region in the corners is equal to a width of the close contact region in the plurality of parallel portions so that the close contact region has the same width in an entire periphery of the humidifying membrane.

8. The humidifier for a fuel cell according to claim 7, wherein corners of the second outer edge portion of the protective film have a circular arc shape.

* * * * *